(No Model.)
E. BRADLEY & D. GALLAGHER.
ICE CUTTING MACHINE.
No. 433,713. Patented Aug. 5, 1890.
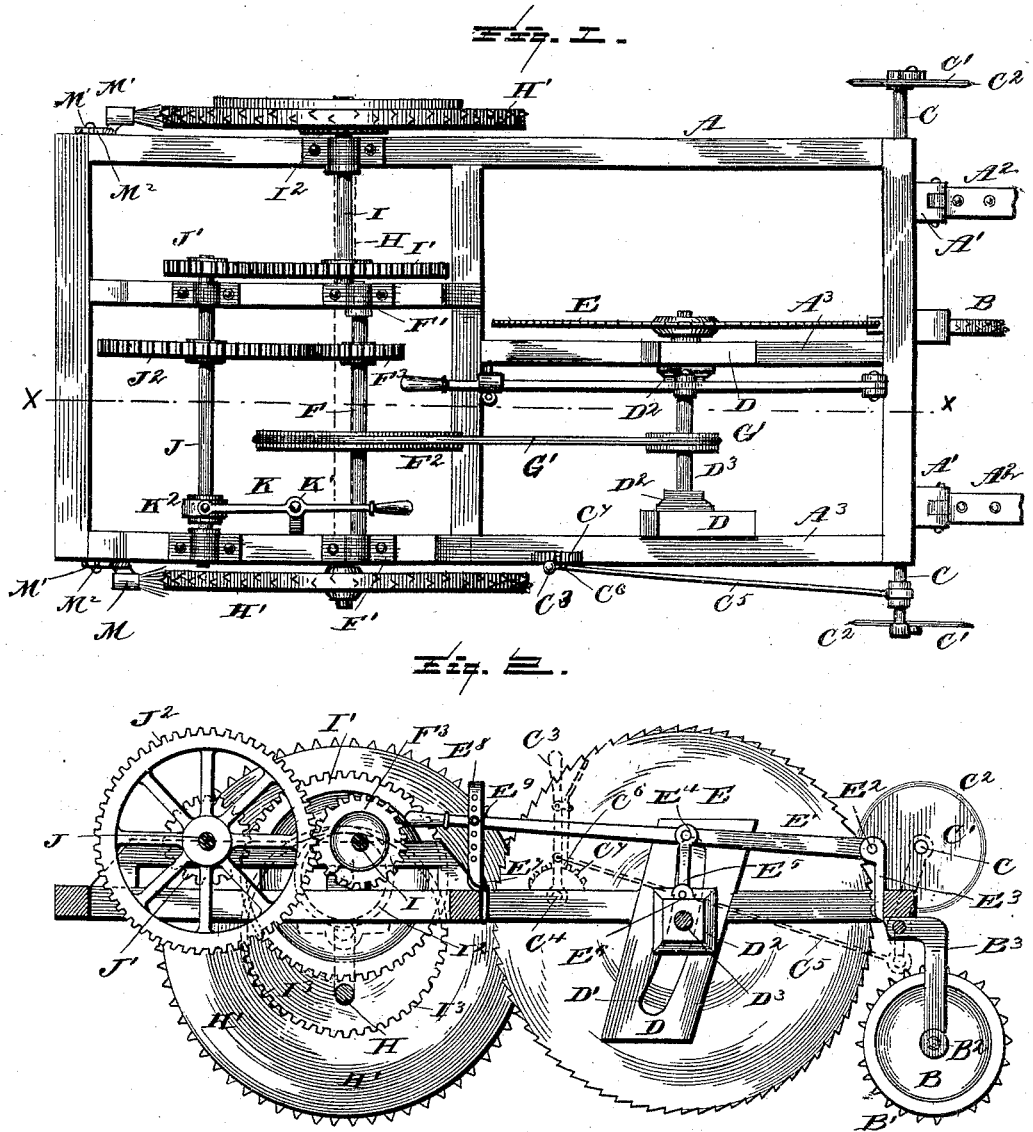
Witnesses
L. C. Hills.
E. H. Bond.
Inventor
Edward Bradley and
Dominick Gallagher.
By E. B. Stocking

UNITED STATES PATENT OFFICE.

EDWARD BRADLEY AND DOMINICK GALLAGHER, OF CLINTON, IOWA.

ICE-CUTTING MACHINE.

SPECIFICATION forming part of Letters Patent No. 433,713, dated August 5, 1890.

Application filed October 17, 1889. Serial No. 327,281. (No model.)

*To all whom it may concern:*

Be it known that we, EDWARD BRADLEY and DOMINICK GALLAGHER, citizens of the United States, residing at Clinton, in the county of Clinton and State of Iowa, have invented certain new and useful Improvements in Ice-Cutting Machines, of which the following is a specification, reference being had therein to the accompanying drawings.

This invention relates to certain new and useful improvements in ice-cutting machines designed for the purpose of cutting ice on a lake or other frozen body of water; and it has for its object to provide an improved device of this class, wherein provision shall be made for readily raising and lowering the saw and for the use of saws of different diameters.

It has for its further object the provision of ready means for throwing the saw in and out of gear and for separating the cakes of ice when cut.

Other objects and advantages of the invention will appear in the following description, and the novel features thereof will be particularly pointed out in the claims, the novelty residing in the peculiarities of construction, the combinations, arrangements, and adaptations of parts, all as more clearly hereinafter described, shown in the drawings, and then particularly pointed out in the claims at the end of the same.

The invention is clearly illustrated in the accompanying drawings, which, with the letters of reference marked thereon, form a part of this specification, and in which—

Figure 1 is a top plan of an ice-cutting machine constructed in accordance with our invention, and Fig. 2 is a vertical longitudinal section of the same on the line $x\ x$ of Fig. 1.

Like letters refer to like parts in both the figures of the drawings.

Referring to the details of the drawings by letter, A designates a suitable frame composed of longitudinal and transverse timbers suitably connected together, and the whole designed to properly support the machinery or mechanism hereinafter described. The device may be propelled by any suitable power, and in the drawings we have shown it as adapted to use in connection with horses or other like animals of draft. For this purpose we provide the forward ends of the frame with suitable attachments, as A', to which the shafts $A^3$ may be connected in any suitable manner.

At the forward end of the frame we provide a caster-wheel B, having its periphery spiked or otherwise formed or provided with projections or otherwise roughened, as at B', to prevent it from slipping when in motion on the ice. This caster-wheel is carried upon the shaft $B^2$, suitably journaled in the hanger $B^3$, attached to the forward end of the frame in any suitable manner. This caster-wheel serves also as a bearing for the weight of the front end of the machine.

Suitably journaled across the forward end of the frame is a shaft C, which carries at each end a wheel or rolling colter C', having its periphery sharpened, as shown. These wheels or colters are so arranged upon their shafts that when one is down the other is up. This can be accomplished in any suitable manner. The object of these wheels or colters is to separate the cakes of ice when they are cut. The wheel that is down runs in the last cut made by the saw, thus separating the ice cut from the body of the ice. When the machine is moving in the opposite direction, the other colter is thrown down and serves the same purpose in the reverse movement of the machine. The position of the colters is changed by means of the levers $C^3$, suitably pivoted at one end, as at $C^4$, to one of the longitudinal timbers of the frame, and connected by means of the rod $C^5$ with the longitudinal shaft C, the said lever being provided with a suitable pawl $C^6$, engaging a racked segment $C^7$ upon the said longitudinal timber to hold the parts in their adjusted position, this latter feature being well understood in the art. Attached to the longitudinal timbers $A^3$ of the frame are the plates D, provided with curved slots D', in which are designed to work the boxes $D^2$, in which the saw-arbor $D^3$ is journaled.

E is the saw attached to the saw-arbor in any suitable manner, so as to render the same readily detachable, if desired, for the purpose of replacing the same with one of different size, when desired. The slots D' are formed on the arc of a circle the center of which is the shaft F, hereinafter described, for the purpose of avoiding slack of the belt which runs the wheel and saw when the wheel and saw are lowered and raised, in order to keep the belt sufficiently tight to properly operate the parts. The saw is readily raised and lowered by means of the lever E′, pivoted at E² at one end upon the bracket-arm E³, suitably attached to the frame and between its ends, having pivotally connected thereto, as at E⁴, one end of a link E⁵, the other end of which is pivotally connected, as at E⁶, with one of the boxes D², as clearly shown in Fig. 2. The other end of this lever is provided with a suitable handle. This lever is guided by means of the guide-brackets E⁷, attached to one of the cross-bars of the frame, and is provided with a plurality of holes E⁸, through which and through a hole in the lever passes a transverse pin E⁹, to hold the parts rigidly in their adjusted position.

F is a transverse shaft journaled in suitable boxes or bearings F′. Toward the rear of the frame and fast on this shaft is the grooved pulley F², around which passes the endless belt G, which also passes around the grooved pulley G′ on the saw-arbor D³. Upon this shaft F is also a pinion F³, for a purpose hereinafter described.

H is the axle journaled in suitable bearings upon the under side of the frame, toward the rear thereof and extended downward, as shown in Fig. 2, to provide room for the gearing hereinafter described. By reducing the size of the gear-wheels a straight axle might be employed. Upon the end of this axle are the traction-wheels H′, the peripheries of which are spiked or otherwise roughened to prevent their slipping when the machine is in motion.

Motion is imparted from the traction-wheels to the shaft F in the following manner: I is a transverse shaft journaled in suitable bearings on the frame and carrying at one end a large pinion I′. At the other end this shaft carries a pinion I², which meshes with and receives motion from an internal gear I³ upon the wheel H′, so that in the revolution of the traction-wheel motion is imparted to the shaft I and consequently to the pinion I′. J is another transverse shaft suitably journaled in bearings upon the frame and carrying at its inner end a wheel J′, meshing with the pinion I′, and also carrying a larger pinion J², meshing with the pinion F³ upon the shaft F. Motion is thus conveyed from the pinion I′ to the pinion J′, which revolves the shaft J, and the pinion J² thereon, meshing with the pinion F³, rotates the shaft F, and the rotation of this shaft through the medium of the pulleys F² and G′ and the endless belt G causes the saw to revolve.

In order to throw the gears J′, I′, J², and F³ into and out of gear, we provide the following mechanism: K is a lever pivoted at K′ upon a suitable support on the frame, and at its other end attached to a sleeve K², fast upon the shaft J, whereby the said shaft J may be moved endwise in its bearings to throw the said pinions into and out of gear.

A device constructed as above described has proved very efficient in operation, and is adapted for use upon ice of different thicknesses, the saw being raised or lowered according to the thickness of the ice.

The colters C′, besides serving to separate the cakes, as above described, also act as guides to the machine. The colter which is down, running in the last cut made by the saw, keeps the machine in proper position to have the saw cut on a line parallel with the last cut made by said saw.

M M are brushes adjustably held to the frame in any suitable manner—as, for instance, by means of set-screws M′, passed through elongated slots M²—and arranged with their wires in contact with the outer rear rims of the drive-wheels H′ to keep the peripheries of the wheels clean from broken ice.

What we claim as new is—

1. In an ice-cutting machine, the combination, with the frame, the saw, and its operating mechanism, of a shaft C, journaled at the forward end of the frame, a colter-wheel at each end of the shaft, the said wheels being arranged as shown, whereby when one wheel is up the other is down, substantially as specified.

2. In an ice-cutting machine, the combination, with the frame, the saw, and its operating mechanism, of a shaft journaled at the forward end of the frame, a colter-wheel at each end of the shaft, the said wheels being arranged in opposite planes, and the lever and connections for reversing the position of the colter-wheels, whereby when one wheel is up the other is down, substantially as specified.

3. In an ice-cutting machine, the combination, with the cutting devices, of the two colter-wheels on the front end of the frame and arranged upon a single shaft in different horizontal planes, one wheel being arranged to be up while the other is down, as set forth.

In testimony whereof we affix our signatures in presence of two witnesses.

EDWARD BRADLEY.
DOMINICK GALLAGHER.

Witnesses:
  JOHN JACKSON,
  JOHN McLAUGHLIN.